(12) United States Patent
Moody et al.

(10) Patent No.: US 6,485,029 B1
(45) Date of Patent: Nov. 26, 2002

(54) INFLATABLE SEALING DEVICE

(75) Inventors: Paul E. Moody, Barrington, RI (US); John A. Schwemin, Middletown, RI (US); Michael R. Ryerson, Fall River, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 52 days.

(21) Appl. No.: 09/685,147

(22) Filed: Oct. 11, 2000

(51) Int. Cl.[7] .............................. F16J 15/48; E06B 7/18
(52) U.S. Cl. ........................ 277/642; 277/646; 277/921; 49/477.1; 49/303
(58) Field of Search ................................ 277/637, 641, 277/642, 645, 646, 921; 49/477.1, 303, 304

(56) References Cited

U.S. PATENT DOCUMENTS

| | | | | |
|---|---|---|---|---|
| 2,104,144 A | * | 1/1938 | Zand | |
| 2,530,160 A | * | 11/1950 | Finley | |
| 2,908,948 A | * | 10/1959 | Jones | |
| 3,161,229 A | * | 12/1964 | Sanders | |
| 3,171,381 A | * | 3/1965 | Meek | |
| 3,178,779 A | * | 4/1965 | Clark et al. | |
| 3,352,446 A | * | 11/1967 | Anderson et al. | |
| 3,747,275 A | * | 7/1973 | May et al. | |
| 3,968,597 A | * | 7/1976 | Hirtle | |
| 4,114,901 A | * | 9/1978 | Pot | |
| 4,227,702 A | * | 10/1980 | Thate | |
| 4,342,336 A | * | 8/1982 | Satterthwaite et al. | |
| 4,665,653 A | * | 5/1987 | Franz et al. | |
| 4,706,413 A | * | 11/1987 | James | |
| 4,761,917 A | * | 8/1988 | Knecht et al. | |
| 4,995,196 A | * | 2/1991 | Smith | |
| 5,001,866 A | * | 3/1991 | Powell et al. | |
| 5,046,285 A | * | 9/1991 | Fratini, Jr. et al. | |
| 5,163,187 A | * | 11/1992 | Dannenberg et al. | |
| 5,209,498 A | * | 5/1993 | Colin | |
| 6,029,977 A | * | 2/2000 | Sym | 277/312 |
| 6,195,941 B1 | * | 3/2001 | Burow et al. | 49/477.1 |

* cited by examiner

*Primary Examiner*—Anthony Knight
*Assistant Examiner*—Alison Kaye Pickard
(74) *Attorney, Agent, or Firm*—Michael J. McGowan; Michael F. Oglo; James M. Kasischke

(57) ABSTRACT

An inflatable sealing device is used to seal a door, such as a shutter door in a submarine, when the door is closed. The inflatable sealing device includes a seal retainer positioned around the opening through a structure, such as a submarine hull or other type of wall. An inflatable seal is positioned with a retainer cavity within the seal retainer. The inflatable seal includes a seal periphery and a seal tip extending from the seal periphery. The seal periphery preferably has an elliptical cross section in a deflated state and a circular cross section in an inflated state such that the seal tip extends into a gap to seal the door when the inflatable seal is pressurized and inflated. The seal tip retracts into the seal retainer when the inflatable seal is deflated. A pressure actuator, such as a bellows, is used to pressurize the inflatable seal using an actuating fluid. The bellows can be compressed using a door arm coupled to the door such that the seal is automatically actuated to seal the door as the door reaches its fully closed position.

25 Claims, 2 Drawing Sheets

INFLATABLE SEALING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to sealing devices, and more particularly, relates to an inflatable sealing device for sealing a door covering an opening, such as a shutter door in an underwater vessel.

(2) Description of the Prior Art

Many submarines include an outer hull with a shutter door contoured to the outer hull. The shutter door opens and closes, for example, to allow devices to be ejected from the submarine. In existing submarines, a clearance is provided between the shutter door and the outer hull because close tolerance fits cannot be obtained in ship building without incurring expensive manufacturing costs. Furthermore, as sections of the pressure hull of the submarine are stress relieved, the connecting components move in relation to their original as built configuration. Therefore, even if a perfect tolerance fit was obtained with the original ship construction, the fit would no longer be perfect after the ship had been in operation for a period of time.

This clearance between the outer hull shutter door and the actual outer hull creates flow perturbations resulting in increased ship drag and ship flow noise. In an attempt to solve this problem, newer ships have incorporated a flexible seal around the shutter door. Theoretically, the seal would move when required by component operations and return to sealing position once the shutter was closed. This solution, however, met with a number of problems.

When the shutters were closed, the seal experienced force imbalances resulting from a lower pressure in the outer boundary layer portion of the hull as compared to the relatively stagnant sea pressure in the free flood area of the ship. As a result, the seal would open in order to relieve the pressure imbalance, and once the pressure was relieved, the seal would close again. This resulted in seal vibrations impacting the life expectancy of the seal.

Ejecting devices through the open shutter also damages the seal by flow forces and physical forces associated with the ejection process. Additional damaging forces were caused by physical interference between the seal and the moving parts of the shutter door during operation. This existing seal design was cantilevered approximately 2½ in. from a solid support, and the maximum deflection stress was absorbed by the rubber seal itself. This seal design and the forces caused by moving the shutter and ejecting devices through the open shutter resulted in excessive seal failure.

SUMMARY OF THE INVENTION

A first object is the provision of a seal which is not subject to mechanical wear and tear as the door which it surrounds is opened and closed.

Another object is the provision of a seal which can seal large areas where obtaining a close fit is impossible.

Yet another object of the present invention is a seal that can be used around a shutter door to decrease a ship's drag and hydrodynamic flow noise without being susceptible to forces that may cause excessive vibrations or seal failure.

Accordingly, the present invention features an inflatable sealing device for use with a door covering an opening in a structure. The inflatable sealing device comprises a seal retainer positioned around the opening in the structure. The seal retainer defines a retainer cavity and a slot extending from the retainer cavity toward the opening. An inflatable seal is positioned within the retainer cavity. The inflatable of seal includes a periphery defining a seal cavity and a seal tip extending from the periphery and into the slot. A pressure actuator is fluidly coupled to the seal cavity of the inflatable seal for pressurizing the seal cavity and inflating the periphery, whereby the seal tip moves through the slot and into the opening to engage and seal the door.

According to the preferred embodiment, the periphery of the inflatable seal has an elliptical cross section in a deflated state. The retainer cavity is shaped such that the periphery of the inflatable seal has a substantially circular cross section when in an inflated state. The retainer cavity preferably has a first region with dimensions generally corresponding to the elliptical cross section and a second region with dimensions generally corresponding to the substantially circular cross section. The seal periphery expands into the second region when in the inflated state and retracts into the first region when in the deflated state.

The present invention also features a sealable shutter door mechanism comprising a door together with the seal retainer, the inflatable seal, and the pressure actuator. The pressure actuator can be actuated by the door closing or actuated independently of the door closing.

In one embodiment, the pressure actuator includes a bellows fluidly coupled to the seal cavity. The bellows forces an actuating fluid into the seal cavity when the bellows is compressed. A door arm is preferably coupled to the door for compressing the bellows while closing the door. A spring positioned around the bellows uncompresses the bellows when the seal is to be deflated. The door can include a hinged door or a rotating door.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
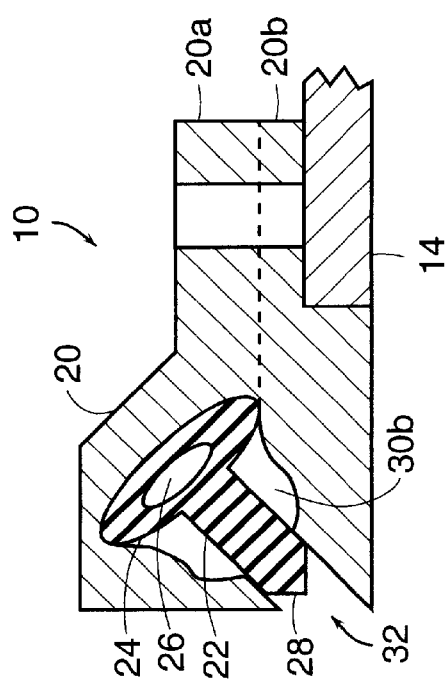
FIG. 1 is a cross-sectional view of an inflatable seal, according to the present invention, in a deflated state.
Figure 2:
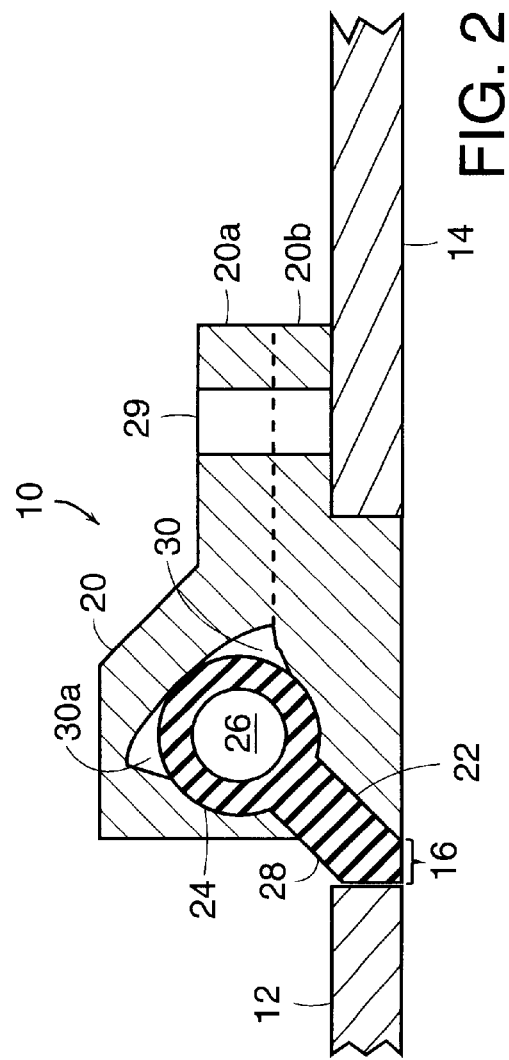
FIG. 2 is a cross-sectional view of the inflatable seal in an inflated state.
Figure 4:
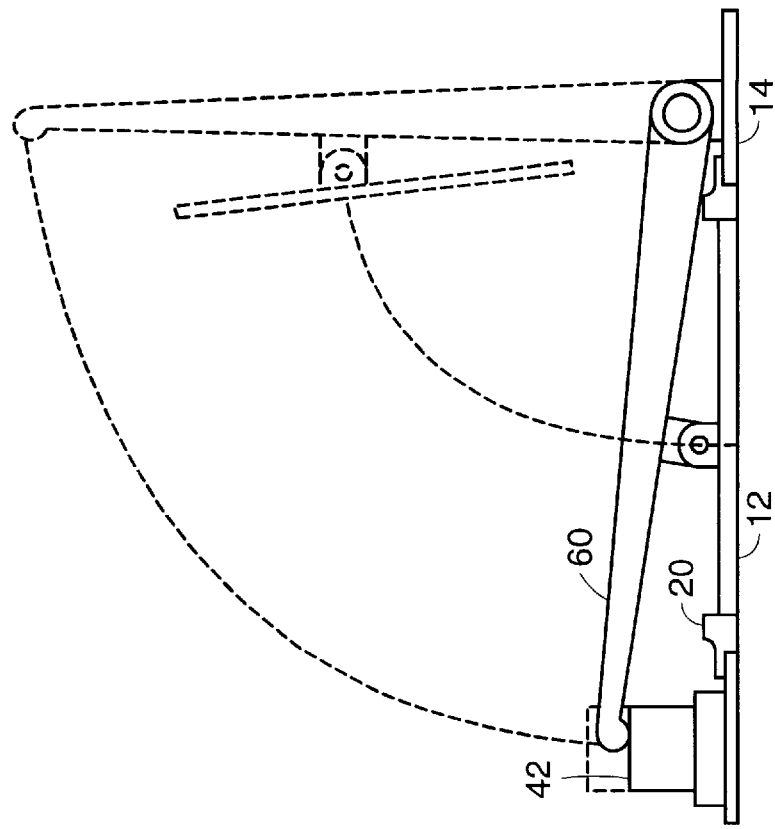
FIG. 4 is a elevational view of a door and door arm for actuating the bellows mechanism, according to one embodiment of the present invention.

The inflatable sealing device 10, FIGS. 1 and 2, according to the present invention, is used to seal a door 12 covering an opening in a structure 14. In the exemplary embodiment, the inflatable seal device 10 is used to seal the gap 16 between a shutter door and an outer hull in a submarine. The inflatable sealing device 10 of the present invention can also be used to seal other types of doors or structures that open and close.

The inflatable sealing device 10 includes a seal retainer 20 that retains an inflatable seal 22. The inflatable seal 22 includes a seal periphery 24 defining a seal cavity 26 and a seal tip 28 extending from the seal periphery 24. The seal cavity 26 is pressurized to inflate the seal periphery 24 and cause the seal tip 28 to seal the gap 16. The inflatable seal 22 is self-adapting to provide effective sealing despite construction variations and tolerances resulting in uneven gaps between the shutter door edge and the submarine hull. Also, complete failure of the rubber portion of the seal tip 28 will not result in an excessive gap between the door and hull. If desired, the seal tip 28 can also be contoured to match actual clearances between mechanical parts and can be custom contoured in place to accommodate unique hardware on a ship without affecting the inflatable periphery 24 of the seal. The seal periphery 24 and seal tip 28 are preferably molded as one piece from an elastomeric material or other material suitable for use as a seal.

The seal retainer 20 is secured to the structure 14 around the opening. In one example, the seal retainer 20 is bolted to the structure 14 with a bolt (not shown) extending through a bolt hole 29 in the retainer 20. The seal retainer 20 includes a retainer cavity 30 that houses the seal periphery 24 and a retainer slot 32 that houses the seal tip 28. Protecting the seal periphery 24 within the retainer cavity 30 improves the reliability of the inflatable seal 22. The seal retainer 20 is preferably formed into two pieces, 20a, 20b for ease of manufacture, seal installation, and seal replacement. Thus, new seals can easily be installed to accommodate changes in component clearances resulting from ship structural changes due to stress relieving.

The inflatable seal 22 and retainer cavity 30 are designed such that the seal tip 28 is completely within the retainer slot 32 when retracted (see FIG. 1) and extends out of the retainer slot 32 into the gap 16 when extended (see FIG. 2). Therefore, if the door 12 is opening/closing or if high velocity flow or an actual device passes through the opening, the seal tip 28 is completely retracted and protected from physical or direct hydrodynamic contact.

The seal periphery 24 preferably has an elliptical cross section in its natural or deflated state (see FIG. 1) and a substantially circular cross section in its inflated state (see FIG. 2). The retainer cavity 30 preferably includes a first cavity region 30a having dimensions generally corresponding to the dimensions of the elliptical cross section for housing the seal periphery 24 in the deflated state (FIG. 1) and a second cavity region 30b having dimensions generally corresponding to the circular cross section for housing the seal periphery 24 in the inflated state (FIG. 2). As the inflatable seal 22 is inflated, the seal periphery 24 expands into the second cavity region 30b and forms the circular cross section. When the inflatable seal 22 is deflated, the seal periphery 24 has a natural tendency to return to the elliptical cross section and will retract back into the first cavity region 30a.

Figure 3:
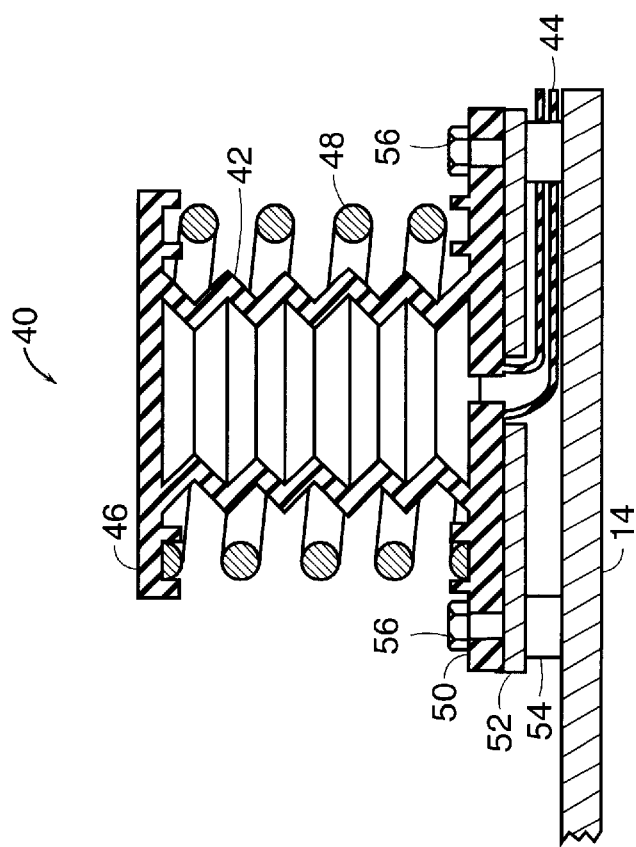
FIG. 3 is a cross-sectional view of a bellows mechanism for pressurizing the inflatable seal, according to one embodiment of the present invention.

A pressure actuator 40, FIG. 3, is fluidly coupled to the seal cavity 26 of the inflatable seal 22 for pressurizing and inflating the inflatable seal 22. The pressure actuator 40 can supply an actuating gas or fluid to the seal cavity 26. The use of an actuating fluid results in minimal system impact related to changes in ships depth. By varying the amount of pressure applied in conjunction with the seal elastomeric properties, the design can be customized to provide proper performance for varying hydrodynamic environments.

According to the exemplary embodiment, the pressure actuator 40 includes a bellows 42 fluidly coupled to the seal cavity 26 by way of a pipe connection 44. An upper end plate 46 is coupled to the bellows 42 for receiving a compression force to compress the bellows 42 and cause an actuating fluid to pressurize and inflate the inflatable seal 22. A bellows spring 48 is preferably disposed around the bellows 42 applies a force to the upper end plate 46 to return the bellows 42 to its non-compressed position.

A lower end plate 50 of the bellows 42 is mounted to the structure 14. The bellows 42 is preferably elevated from the structure 14 using a foundation plate 52 with support legs 54. This allows the piping 44 to pass between the foundation plate 52 and structure 14 to the inflatable seal 22. The piping 44 is preferably a closed system with no dynamic seals required. The lower end plate 50 is preferably bolted to the foundation plate 52 using foundation bolts 56.

In the exemplary embodiment, a door arm 60 is coupled to the door 12 and can be powered by a power cylinder (not shown) to open and close the door 12. As the door arm 60 closes the door 12, the door arm 60 contacts upper end plate 46 and compresses the bellows 42 to force the actuating fluid through the piping 44 and into the seal cavity 26 to expand the inflatable seal 22 (FIG. 2). Although a hinged door 12 is shown, a rotating door can also effect the necessary motion to activate the system. The door arm 60 preferably compresses the bellows 42 when the door 12 is closed to its fully closed position. Thus as the door 12 moves in its final few degrees of rotation, the inflatable seal 22 begins to expand and the seal tip 28 moves toward its extended position within the gap 16 (see FIG. 2). When the door 12 is fully closed, the bellows 42 is fully compressed and the seal tip 28 is fully extended. Thus, actual physical contact between the seal 22 and the door 12 is only effected as the door 12 comes to its final closed position.

Other types of pressure actuators can also be used to pressurize the inflatable seal 22. The seal inflation/deflation can also be provided totally independent of the door operation. According to another alternative, the inflation/deflation of the inflatable seal 22 can precede physical motion of the surfaces of the shutter door sealing surfaces by use of an inflation device which operates independently from door operation.

When the door 12 starts to open, the door arm 60 begins to release the force compressing the bellows 42. The bellows spring 48 then extends the bellows 42 to the non-compressed position and the actuating fluid is drawn back into the bellows 42. The withdrawal of actuating fluid from the seal cavity 26 combined with the natural tendency of the seal periphery 24 to return to its elliptical cross section, results in the seal periphery 24 returning to the first cavity region 30a and the retraction of the seal tip 28 into the retainer slot 32. By retracting the seal tip 28 prior to motion of the shutter door 12, damage to the seal tip 28 during shutter opening and closing operation can be prevented. Further, confining the seal tip 28 within the retainer slot 32 prevents damage to the seal.

Accordingly, the inflatable seal device of the present invention retracts the seal when the door is opened so that the seal is not subjected to hydrodynamic or physical loads. When the door is closed, the inflatable seal is inflated and the gap between the shutter and wall is sealed with a rubber seal backed by metal.

In light of the above, it is therefore understood that within the scope of the appended claims, the invention may be practiced otherwise than as specifically described.

What is claimed is:

1. An inflatable sealing device for use with a door covering an opening through a structure, said inflatable sealing device comprising:

a seal retainer having a first piece removably disposed onto a second piece and positioned around said opening through said structure, said seal retainer defining a retainer cavity and a slot extending from said retainer cavity toward said opening; and an inflatable seal positioned within said retainer cavity, said inflatable seal including a seal periphery defining a seal cavity and including a seal tip extending from said seal periphery and into said slot, said inflatable seal having a deflated state wherein said seal tip is retracted in said slot and an inflated state wherein said seal tip is extended and wherein said seal periphery of said inflatable seal has an elliptical cross-section in said deflated state.

2. The inflatable sealing device of claim 1 wherein said retainer is split longitudinally.

3. The inflatable sealing device of claim 1 wherein said retainer cavity is shaped such that said seal periphery of said inflatable seal has a substantially circular cross-section when in said inflated state.

4. The inflatable sealing device of claim 3 wherein said retainer cavity has a first region with dimensions generally corresponding to said elliptical cross-section and a second region with dimensions generally corresponding to said substantially circular cross-section, wherein said seal periphery expands into said second region when in said inflated state and retracts into said first region when in said deflated state.

5. The inflatable sealing device of claim 1 further comprising a pressure actuator fluidly coupled to said seal cavity of said inflatable seal for pressurizing and inflating seal, whereby said seal tip moves through said slot and into said opening to engage and seal said door.

6. The inflatable sealing device of claim 5 wherein said pressure actuator includes a bellows fluidly coupled to said seal cavity, wherein said bellows forces an actuating fluid into said seal cavity when said bellows is compressed.

7. The inflatable sealing device of claim 6 wherein said pressure actuator further includes a spring around said bellows for uncompressing said bellows when said seal is to be deflated.

8. A sealable shutter door mechanism comprising:

a door for covering an opening through a structure;

a seal retainer having a first piece removably disposed onto a second piece and positioned around said opening through said structure, said seal retainer defining a retainer cavity and a slot extending from said retainer cavity toward said opening;

an inflatable seal positioned within said retainer cavity, said inflatable seal including a seal periphery defining a seal cavity and including a seal tip extending from said seal periphery, said seal tip extending into said slot, said inflatable seal having a deflated state wherein said seal tip is retracted in said slot and an inflated state wherein said seal tip is extended;

wherein said seal periphery has an elliptical cross-section in said deflated state, and wherein said retainer cavity is shaped such that said seal periphery of said inflatable seal has a substantially circular cross-section when in said inflated state and a pressure actuator fluidly coupled to said seal cavity of said inflatable seal for inflating said inflatable seal into said inflated state, whereby said seal tip moves through said slot and into said opening to seal said door.

9. The sealable shutter door mechanism of claim 8 wherein said pressure actuator is actuated by said door closing said opening.

10. The sealable shutter door mechanism of claim 8 wherein said pressure actuator is actuated independently of said door closing.

11. The sealable shutter door mechanism of claim 8 wherein said pressure actuator includes a bellows fluidly coupled to said seal cavity, and an actuating fluid in said bellows and said seal cavity wherein said bellows forces said actuating fluid into said seal cavity when said bellows is compressed.

12. The sealable shutter door mechanism of claim 11 further including a door arm coupled to said door, wherein said door arm compresses said bellows while closing said door.

13. The sealable shutter door mechanism of claim 11 wherein said pressure actuator further includes a spring around said bellows restoring said bellows to an uncompressed position when said seal is to be restored to said deflated state.

14. The sealable shutter door mechanism of claim 8 wherein said door is a hinged door.

15. The sealable shutter door mechanism of claim 8 wherein said door is a rotating door.

16. The sealable shutter door of claim 8 wherein said retainer cavity has a first region with dimensions generally corresponding to said elliptical cross-section and a second region with dimensions generally corresponding to said substantially circular cross-section, wherein said seal periphery expands into said second region when in said inflated state and retracts into said first region when in said deflated state.

17. An inflatable sealing device for use with a door covering an opening through a structure, said inflatable sealing device comprising:

a seal retainer positioned around said opening through said structure, said seal retainer defining a retainer cavity and a slot extending from said retainer cavity toward said opening;

an inflatable seal positioned within said retainer cavity, said inflatable seal including a seal periphery defining a seal cavity and including a seal tip extending from said seal periphery and into said slot, said inflatable seal having a deflated state wherein said seal tip is retracted in said slot and said seal periphery has an elliptical cross-section, and an inflated state wherein said seal tip is extended and said seal periphery has a substantially circular cross-section; and said seal retainer cavity has a first region with dimensions generally corresponding to said elliptical cross-section and a second region with dimensions generally corresponding to said substantially circular cross-section, wherein said seal periphery expands into said second region when in said inflated state and retracts into said first region when in said deflated state.

18. The inflatable sealing device of claim 17 wherein said seal retainer comprises a first piece removably disposed onto a second piece.

19. The inflatable sealing device of claim 18 further comprising a pressure actuator fluidly coupled to said seal cavity of said inflatable seal for pressurizing and inflating said inflatable seal, whereby said seal tip moves through said slot and into said opening to engage and seal said door.

20. The inflatable sealing device of claim 19 wherein said pressure actuator includes a bellows fluidly coupled to said seal cavity, wherein said bellows forces an actuating fluid into said seal cavity when said bellows is compressed.

21. The inflatable sealing device of claim 20 wherein said pressure actuator further includes a spring around said bellows for uncompressing said bellows when said seal is to be deflated.

22. A sealable shutter door mechanism comprising:

a door for covering an opening through a structure;

a seal retainer positioned around said opening through said structure, said seal retainer defining a retainer cavity and a slot extending from said retainer cavity toward said opening;

an inflatable seal positioned within said retainer cavity, said inflatable seal including a seal periphery defining a seal cavity and including a seal tip extending from said seal periphery and into said slot, said inflatable seal having a deflated state wherein said seal tip is retracted in said slot and said seal periphery has an elliptical cross-section, and an inflated state wherein said seal tip is extended and said seal periphery has a substantially circular cross-section;

said seal retainer cavity has a first region with dimensions generally corresponding to said elliptical cross-section and a second region with dimensions generally corresponding to said substantially circular cross-section, wherein said seal periphery expands into said second region when in said inflated state and retracts into said first region when in said deflated state; and a pressure actuator fluidly coupled to said seal cavity of said inflatable seal for inflating said inflatable seal into said inflated state, whereby said seal tip move through said slot and into said opening to seal said door.

23. The sealable shutter door mechanism of claim 22 wherein said seal retainer comprises a first piece removably disposed onto a second piece.

24. The sealable shutter door mechanism of claim 23 wherein said pressure actuator includes a bellows fluidly coupled to said seal cavity, wherein said bellows forces an actuating fluid into said seal cavity when said bellows is compressed.

25. The sealable shutter door mechanism of claim 24 wherein said pressure actuator further includes a spring around said bellows for uncompressing said bellows when said seal is to be deflated.

\* \* \* \* \*